C. A. DICKEY.
ANIMAL TRAP.
APPLICATION FILED APR. 14, 1921.

1,410,737.

Patented Mar. 28, 1922.

Inventor
Costillas A. Dickey
By A. M. Carlsen
Attorney

UNITED STATES PATENT OFFICE.

COSTILLAS A. DICKEY, OF ST. PAUL, MINNESOTA.

ANIMAL TRAP.

1,410,737.  Specification of Letters Patent.  Patented Mar. 28, 1922.

Application filed April 14, 1921. Serial No. 461,249.

*To all whom it may concern:*

Be it known that I, COSTILLAS A. DICKEY, a citizen of the United States, residing at St. Paul, in the county of Ramsey and State of Minnesota, have invented a new and useful Animal Trap, of which the following is a specification.

My invention relates to animal traps, particularly the type designed for catching mice and rats, and wherein a spring actuated bail comes into action when the bait in the trap is touched.

The object of my invention is to provide a simple and efficient trap of such construction that it can be easily set for use without the slightest danger of the operator being accidentally injured by the trap.

Figure 1:
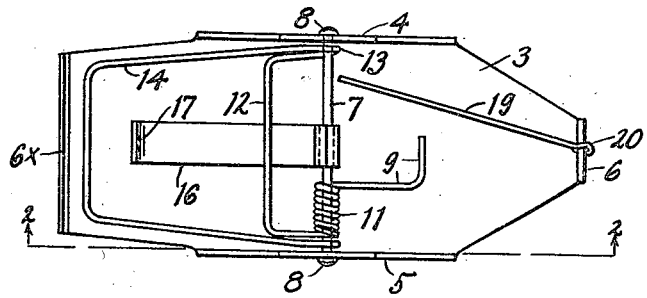
Fig. 1 is a top view of the trap.

Referring to the drawing by reference numerals, the preferred form of my device consists of a flat sheet metal base 3, with two oppositely arranged vertical ears 4, 5, bent up from the base. One end of the base is tapered and then bent upward to form a rear lug 6, while the front end is bent upward forming a catching jaw 6×.

A pivot bar 7 is mounted in the ears 4, 5, and spaced parallel to and a short distance above the base plate 3 and may have its outer ends riveted as at 8 or simply bent over.

Upon said bar 7 I fulcrum a double jaw or bail 12, 14, and a spring 11 for actuating the bails all made of one piece of spring wire; the rear arm 9 of the spring rests on the base plate 3 a short distance back of bar 7.

Figure 2:
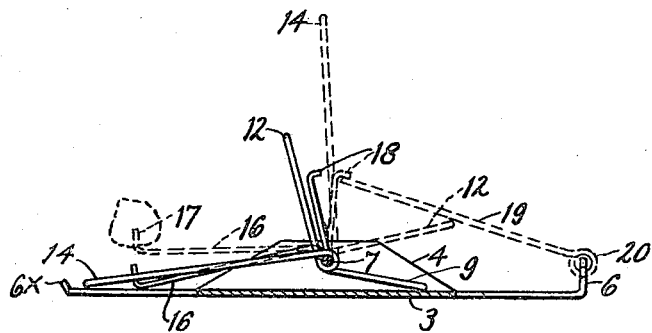
Fig. 2 is a sectional elevation as on line 2—2 of Fig. 1, and showing in dotted lines the set position of the trap.

The other end of the coil spring 11 is bent into a smaller bail 12 the other end of which forms a loop 13 around bar 7 and joins with bail 14 near the ear 4 of the base. The normal position of said bail 12 is approximately as shown in full lines in Fig. 2 which is about at right angles to the larger bail 14 which normally rests with its outer end on plate 3 near the front jaw 6× with which it coacts. Said bails 12, 14, spring 11 and arm 9 are thus formed integrally from one single piece of wire.

At the middle of bar 7 is fulcrumed an L-shaped bait holding trigger lever 16 having a bait hook 17 and a hook shaped arm 18 adapted to be engaged by the free end of a trip lever 19 pivoted at 20 in the lug 6 of the base plate.

In setting the trap after bait has been put in place, the operator while holding the rear part of the base, merely pulls the bail 12 back until lever 19 can be laid on it and engaged with hook 18 of the bait holding member. The spring action of coils 11 will hold bar 19 locked with the bait holding member; the trap is then ready for use and is not brought into action until the mouse or other rodent nibbles on bait, moving bar 16 and disengaging bar 19 from hook 18 at which time the large bail 14 is sprung downward with enough force to catch or kill the rodent. It will be readily seen that this trap is set in such a manner that the operator is at no time in danger of having his fingers or hand caught by the main bail since he needs never get in front of it, a feature not found in other spring operated traps. He can also release the animal without touching it by simply pulling at bail 12 and letting the dead animal drop out.

Having thus described my invention, what I claim is:—

1. An animal trap having a flat oblong base or body, a pivot bar spaced above and extending across the base, a catching bail mounted on the pivot bar and having fixed to it a smaller bail operable from the rear part of the base for setting the main bail, a bait lever pivoted on the pivot bar and having a hook-shaped arm, a trip lever pivoted to the rear end of the base and adapted to hold the small bail down and the main bail raised when the said trip lever has its free end engaged by the hook-shaped arm of the bait lever, and a spring tending at all times to throw the catching bail down upon the front portion of the base; said two bails and the spring being made integral of one piece of wire and all mounted upon the said pivot bar.

2. The structure specified in claim 1, said spring being a torsion coil spring encircling the pivot bar and having one end formed with an arm bearing against the base, the other end being formed into the two bails, one of which is arranged at about right angles to the other.

In testimony whereof I affix my signature.

COSTILLAS A. DICKEY.